United States Patent
Weissinger et al.

[11] Patent Number: 5,960,819
[45] Date of Patent: Oct. 5, 1999

[54] VALVE HAVING MULTI-PART VALVE HOUSING

[75] Inventors: Peter G. Weissinger, Sterling Heights, Mich.; Manuel D. Rosas, Coleta, Ill.

[73] Assignee: Borg-Warner Automotive, Inc., Sterling Heights, Mich.

[21] Appl. No.: 08/880,192

[22] Filed: Jun. 20, 1997

Related U.S. Application Data

[63] Continuation-in-part of application No. 08/684,978, Aug. 7, 1996, abandoned.

[51] Int. Cl.$^6$ ............................ F16D 1/112; F16L 37/248; F16L 37/252
[52] U.S. Cl. .................... 137/315; 137/43; 285/361; 285/396; 285/402; 403/348; 403/349
[58] Field of Search .................... 137/43, 315, 320, 137/321, 322; 220/293, 300, 302, 303; 285/361, 376, 396, 401, 402; 403/348, 349

[56] References Cited

U.S. PATENT DOCUMENTS

| | | | |
|---|---|---|---|
| 1,812,583 | 6/1931 | Cavalieri | 285/361 |
| 2,027,803 | 1/1936 | Young | 285/300 |
| 2,449,659 | 9/1948 | Lane | 285/361 |
| 2,781,148 | 2/1957 | Reddle | 220/300 |
| 3,217,746 | 11/1965 | Voisine | 285/361 |
| 4,313,649 | 2/1982 | Morikawa et al. | 285/396 |
| 4,542,952 | 9/1985 | Tomsa | 339/90 R |
| 4,735,288 | 4/1988 | Uematsu et al. | 194/55.1 |
| 4,756,638 | 7/1988 | Neyret | 403/261 |
| 5,045,192 | 9/1991 | Terhune | 210/232 |
| 5,251,776 | 10/1993 | Morgan, Jr. et al. | 220/300 |
| 5,259,953 | 11/1993 | Baracchi et al. | 210/232 |
| 5,397,196 | 3/1995 | Boiret et al. | 285/396 |
| 5,413,137 | 5/1995 | Gimby | 137/43 |
| 5,439,023 | 8/1995 | Horikawa | 137/43 |
| 5,522,417 | 6/1996 | Tomioka et al. | 137/43 |
| 5,529,201 | 6/1996 | Tallent et al. | 220/302 |
| 5,573,030 | 11/1996 | Ohsaki et al. | 137/43 |
| 5,694,968 | 12/1997 | Devall et al. | 137/202 |

FOREIGN PATENT DOCUMENTS

| | | |
|---|---|---|
| 97 305933 | 7/1998 | European Pat. Off. . |
| 473199 | 5/1975 | France . |
| 2308040 | 11/1976 | France . |
| 2658899 | 8/1991 | France . |
| 2066423 | 7/1981 | United Kingdom . |
| 2140888 | 12/1984 | United Kingdom . |
| WO 96/04089 | 2/1996 | WIPO . |

*Primary Examiner*—George L. Walton
*Attorney, Agent, or Firm*—Reising, Ethington, Barnes, Kisselle, Learman & McCulloch PLLC; Greg Dziegielewski

[57] ABSTRACT

A vent valve for a gasoline tank has a multi-piece valve housing that is inserted into the tank through a tank wall opening. The multi-piece housing includes a valve member of acetal resin and a cap member of high density polyethylene (HDPE) that has a flange that is ultrasonically welded to the gasoline tank and a coupling skirt that has minimal protrusion into the gas tank. The coupling skirt fits into upper a portion of the valve member and has a plurality of key-ways that receive inwardly projecting lugs of the valve member to couple the valve and cap members to each other. The valve and cap members are retained in the coupled position by resilient lock fingers of the valve member that engage notches in the bottom of the coupling skirt. The resilient lock fingers are cantilever beams that extend radially outwardly from an anchor spaced radially inwardly of an outer cylindrical wall of the valve member. The resilient lock fingers do not extend outwardly of the cylindrical wall to provide a snag free coupling arrangement. In a modification the notches coincide with entrance portions of the key-ways. The cap member of a second embodiment has a coupling skirt with key ways that fits over an upper portion of the valve member that has outwardly projecting lugs and resilient lock fingers that are cut out of the wall of the valve member. In a modification of the second embodiment the outwardly projecting lugs and lock fingers are part of the coupling skirt and the key-ways are part of the valve member.

29 Claims, 4 Drawing Sheets

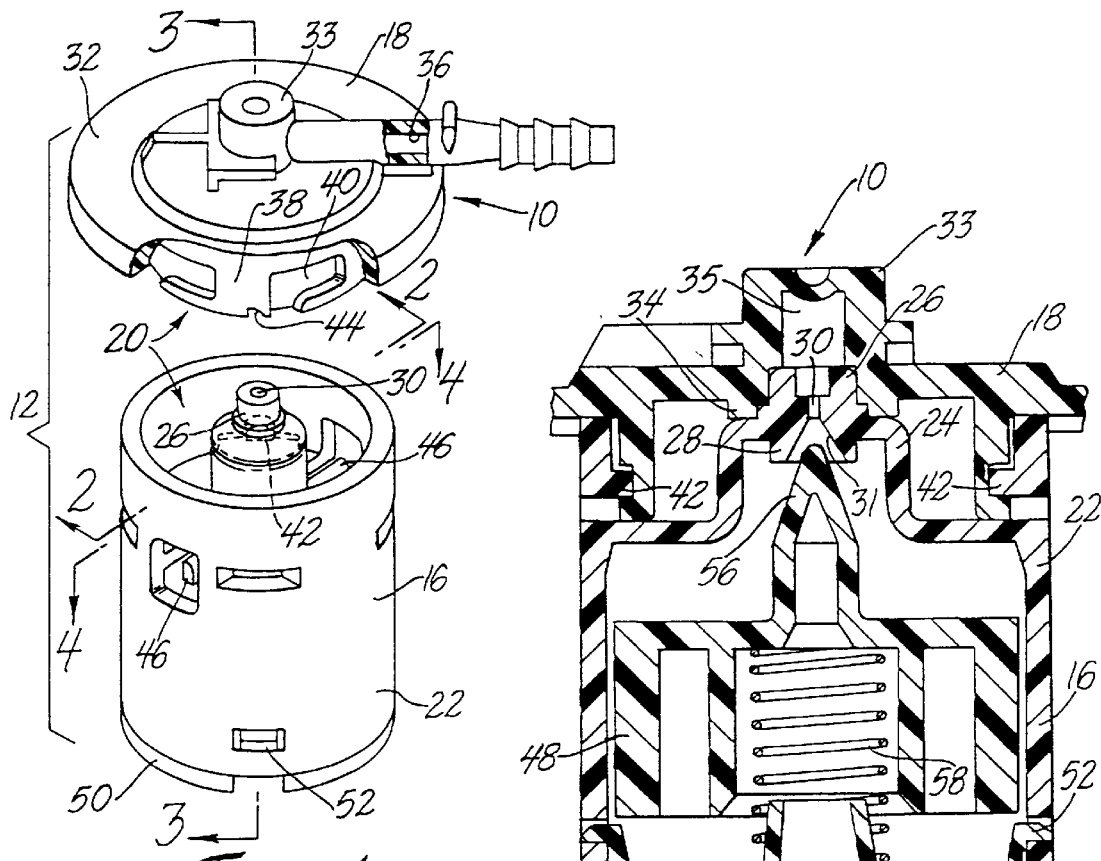
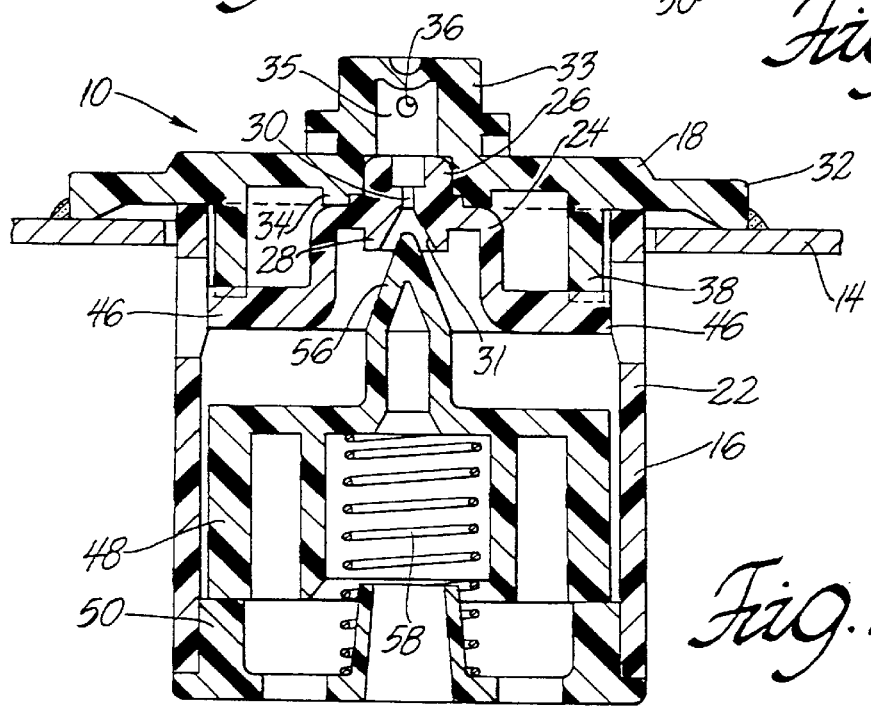
Fig. 1
Fig. 3
Fig. 2

VALVE HAVING MULTI-PART VALVE HOUSING

RELATED APPLICATIONS

This is a continuation-in-part of U.S. patent application Ser. No. 08/684,978 for a Valve Coupling Mechanism filed Aug. 7, 1996 now abandoned.

BACKGROUND OF THE INVENTION

This invention relates to a coupling mechanism for attaching one member to another member and to a valve having a multi-piece valve housing that includes such a coupling mechanism for attaching one housing member to another housing member.

Coupling mechanisms for attaching one member to another are already known for various constructions. See for instance: U.S. Pat. No. 1,812,583 to Cavalieri; U.S. Pat. No. 2,027,803 to Young; U.S. Pat. No. 2,781,148 to Reddle; U.S. Pat. No. 4,313,649 to Morikawa et al; U.S. Pat. No. 5,251,776 to Morgan, Jr. et al; and U.S. Pat. No. 5,397,196 to Boiret et al which disclose coupling mechanisms of the so called bayonet slot type in various applications.

Valves having multi-piece valve housings are also known but none are known that use coupling mechanisms of the bayonet slot or quick disconnect type.

U.S. Pat. No. 5,413,137 granted to David R. Gimby May 9, 1995 discloses a fuel vapor vent assembly that has a multi-piece valve housing. The housing includes a body member that has an integral cap member. The housing also includes an insert and a spring seat. The insert is press fitted into the upper end of the body member to provide an orifice for fuel vapors to escape from the fuel tank and a liquid trap basin above the orifice for catching any liquid fuel entrained in the fuel vapors that exit the fuel tank through the orifice. The spring seat has hooks that are snap fit into apertures of the body member for retention. The fuel tank and the valve member are made of a high density polyethylene (HDPE), a material that is known for high strength, weldability and resistance to gasoline fuel. This insert is preferably made of acetal copolymer that is highly resistant to fuel permeation and therefore does not grow when immersed in gasoline.

U.S. Pat. No. 5,522,417 granted to Kazuyki Tomoika and Atsushi Takahashi Jun. 4, 1996 discloses an anti-spilling valve for a vehicle fuel tank that has a multi-piece valve housing. The housing includes a valve chamber, a mounting member and a valve seat ring. The valve chamber which is immersed in gasoline is advantageously formed of polyacetal resin to minimize growth while the mounting member is advantageously made of high density polyethylene resin (HDPE) for weldability to the fuel tank which is commonly made of this material. The three parts are fabricated and assembled by molding the mounting member of HDPE resin over the upper end of a premolded valve chamber formed of polyacetal resin. The valve seat ring is then fixed to the valve chamber by ultrasonic welding.

SUMMARY OF THE INVENTION

In one aspect, the object of this invention is to provide a coupling mechanism that is easily engaged by sliding one member into another member axially, and then twisting one member relative to the other member to retain the members together in a locked engagement that cannot be released without manual manipulation.

In another aspect, the object of this invention is to provide a valve that has a multi-piece valve housing that has such a coupling mechanism for attaching one valve housing member to another valve housing member.

In yet another aspect, the object of this invention is to provide a valve for insertion into a gasoline fuel tank that has a multi-piece valve housing that includes members configured for advantageous use of different materials and/or advantageous incorporation of a coupling mechanism for securely coupling the members together easily.

In still another aspect, the object of this invention is to provide a multi-piece assembly that -incorporates a snag-proof coupling mechanism for attaching two members of the multi-piece assembly pieces to each other.

These and other objects, features and advantages of the invention will become more apparent from the following description of a preferred embodiment taken in conjunction with the accompanying drawing.

BRIEF DESCRIPTION OF THE DRAWING

FIG. 1 is an exploded perspective view of a fuel vapor vent valve having a multi-piece housing that includes a coupling mechanism in accordance with the invention;

FIG. 2 is a section taken substantially along the line 2—2 of FIG. 1 looking in the direction of the arrows;

FIG. 3 is a section taken substantially along the line 3—3 of FIG. 1 looking in the direction of the arrows;

DESCRIPTION OF THE PREFERRED EMBODIMENT

Figure 4:
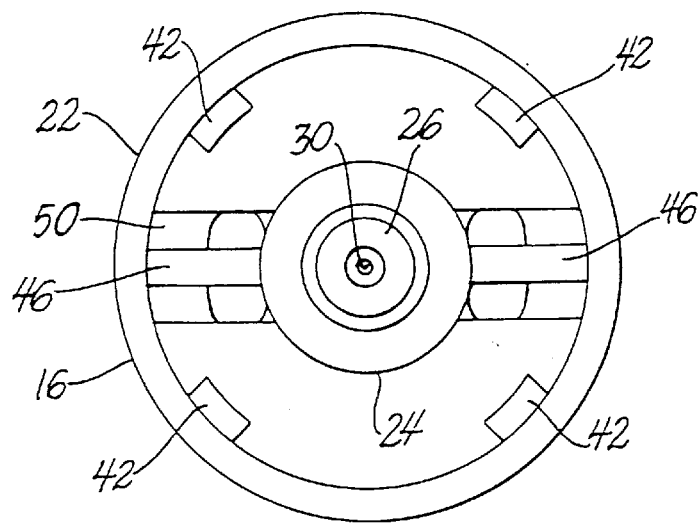
FIG. 4 is a section taken substantially along the line 4—4 of FIG. 1 looking in the direction of the arrows.

Referring now to the drawing and more particularly to FIGS. 1, 2, 3 and 4, the fuel vapor vent assembly 10 comprises a multi-part valve housing 12 of molded plastic construction for insertion into a fuel tank 14 through an opening through a wall of the tank as best shown in FIG. 2. Housing 12 comprises a valve member 16 and a cap member 18 that are attached together by a coupling arrangement indicated generally at 20. Valve member 16 is preferably molded of a material that is highly resistant to gasoline fuel permeation and experiences little or no growth when immersed in gasoline, such as acetyl resins and copolymers. On the other hand, cap member 18 is preferably molded of material that is readily weldable to gasoline tanks such as high density polyethylene (HDPE).

Structurally, valve member 16 has a cylindrical wall 22 that has an outer diameter that is somewhat smaller that the diameter of the opening through the wall of the fuel tank 14 so that the valve member 16 can be inserted into the fuel tank 14 through the opening easily. Valve member 16 has a hat shaped top wall 24 that supports a vertical tube 25 that defines upper and lower aligned collars 26 and 28 and a vertical passage 30 through the top. Passage 30 includes an upper liquid catch basin in upper collar 26, a central orifice and a lower valve seat 31 in lower collar 28.

Cap member 18 has a flange 32 that has an outer diameter that is considerably larger than the diameter of the opening through the wall of the fuel tank 14. Thus flange 32 is adapted to be attached to an exterior surface of the wall of the fuel tank 14 when valve member 16 is inserted into the fuel tank. Cap member 18 is preferably welded to the top of fuel tank 14 as indicated in FIG. 2.

Cap member 18 includes upper and lower collars 33 and 34 that define a seat for upper collar 26 of valve member 16, a vapor cavity 35 above the liquid catch basin in upper collar 26, and a traverse exit passage 36 that extends through an exit pipe above flange 32.

Upper collar 26 of valve member 16 and lower collar 34 of cap member 18 form a sealed passage from the valve seat 31 to the outboard end of the exit pipe when the upper collar 26 of valve member 16 is seated in the lower collar 34 of cap member 18 by coupling the valve and cap members 16 and 18 together.

The means for coupling cap member 16 to valve member 18 includes a depending skirt 38 of cap member 16 that is sized for insertion into the upper end portion of the cylindrical wall 22. The outer wall of skirt 38 includes a plurality of circumferentially spaced key-ways 40. Key-ways 40 are generally L-shaped and have an axial open-ended leg that leads to a circumferential close-ended circumferential leg. Valve member 18 has a corresponding number of circumferentially spaced lugs 42 on the inner surface of cylindrical wall 22 that protrude radially inwardly. Lugs 42 enter key ways 40 via the entrances of the open ended axial legs when skirt 38 is inserted into cylindrical wall 22 and engage the circumferential legs in a coupling position when valve member 18 is then rotated in a clockwise direction with respect to cap member 16. Lugs 42 preferably engage the closed ends of the circumferential legs in the coupling position.

The cap member 16 and the valve member 18 also include means for retaining lugs 42 in the coupling position comprising a plurality of circumferentially spaced notches 44 in the bottom of skirt 38 and two resilient lock fingers 46 of the valve member 16 that engage two of the circumferentially spaced notches 44 when the lugs 42 are in the coupling position. Lock fingers 46 are attached to the hat-shaped top wall 24 at one end and extend radially outwardly in cantilever fashion. Radial lock fingers 46 preferably terminate at the inner surface of cylindrical wall 22 to facilitate molding valve member 18 and so that the radial lock fingers 46 do not protrude outwardly of the cylindrical wall 22 and cause snagging problems. Cylindrical wall 22 has four circumferentially spaced slots in the upper portion to facilitate molding of lugs 42 and two diametrically opposed rectangular windows that facilitate molding of the radial lock fingers 46. The rectangular windows also provide access for depressing the ends of the lock fingers 46 and releasing the lock fingers 46 from the notches 44.

Lock fingers 46 are preferably relaxed and substantially unstressed when engaged in notches 44. Two lock fingers are also preferably used as a safety to prevent inadvertent uncoupling of the valve and cap members 16 and 18 because both lock fingers 46 must be depressed simultaneously to initiate release and uncoupling. For a more permanent attachment several lock fingers can be used as the difficulty of initiating release increases with the addition of each locking finger. On the other hand, a single locking finger may be preferred where frequent uncoupling is necessary.

A float 48 is disposed inside valve member 18 and retained by a seat 50 that is attached to the bottom of wall 22 by outwardly projecting hooks 52 that snap fit into in slots 54 in the bottom portion of wall 22. Float 48 includes a hollow stem shaped valve 56 that cooperates with the lower valve seat 31 of valve member 16. Float 48 rests on a coil spring 58 that is supported by seat 50. Vent valve 12 is normally open to vent fuel vapors in fuel tank 14 to a vapor storage device such as a charcoal canister (not shown). However, the vent valve 12 is closed by float 48 to prevent liquid fuel flow through passage 30 when the fuel tank 14 is tilted, inverted or full of fuel.

Figure 5:
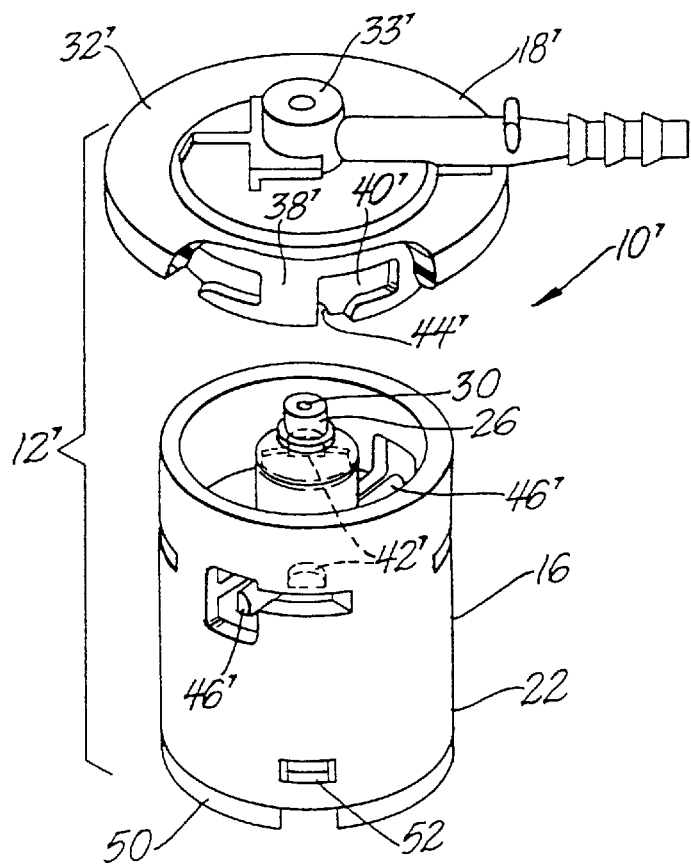
FIG. 5 is an exploded perspective view of a modification of the fuel vapor vent valve shown in FIGS. 1–4.

FIG. 5 illustrates a modified vent valve 10' having a multi-part valve housing 12' wherein the lock fingers 46' of the valve member 16' are repositioned in the circumferential direction and the notches 44' of the cap member 18' are repositioned in the skirt 38' to coincide with the entrance portion of the L-shaped slots 40'. Vent valve 12' is otherwise the same as vent valve 12 and corresponding parts are identified with the same numerals. In modified vent valve 12'; each of the resilient lock fingers 46' engage a wall portion at the open-end of a key-way 40' to secure the members in the locking position where each of the lugs 42 engage a wall at the closed end of the key-way.

Figure 6:
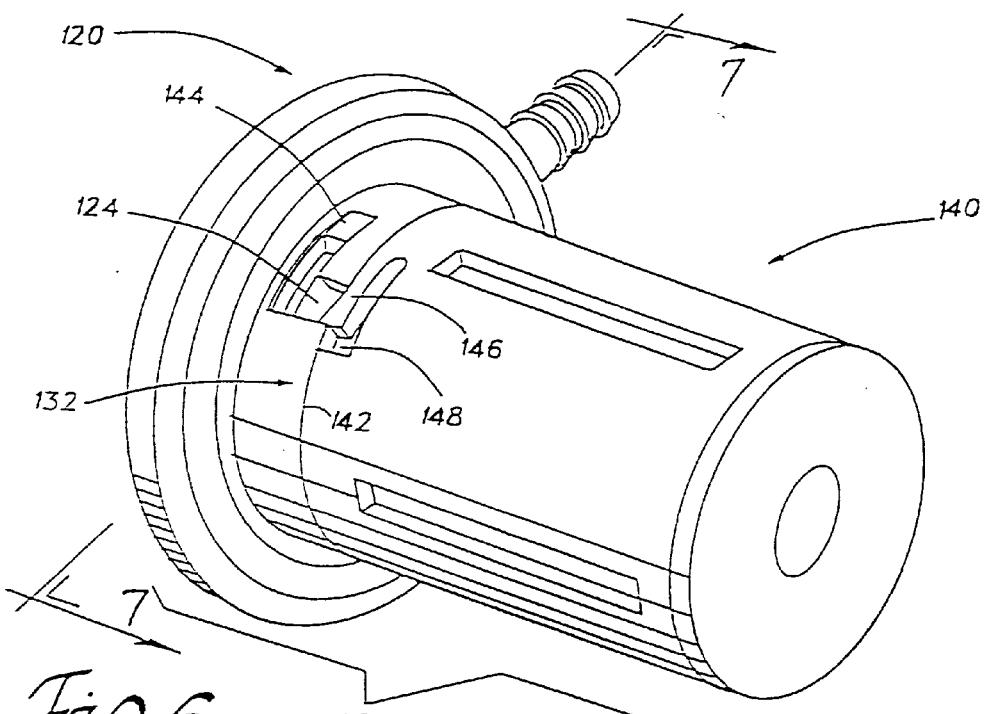
FIG. 6 is a perspective view of another fuel vapor vent valve having a multi-piece housing that includes a second preferred embodiment of the valve coupling mechanism of the present invention.

FIG. 6 discloses another vent valve having a multi-piece housing that includes a second preferred embodiment of the valve coupling mechanism of the present invention indicated generally at 110. In this embodiment the outer diameter of the skirt of the cap or fitting member 120 is the same as the outer diameter of the cylindrical wall of the valve or body member 140. In this case valve member 140 includes an upper neck portion 142 onto which the skirt of the cap member 120 fits for coupling. The valve coupling mechanism 110 includes retention means 114 comprising rectangular-shaped radial lugs 144 disposed relative to the valve member 140, and L-shaped or bayonet slotted keyways 124 disposed relative to the fitting.

The valve coupling mechanism 110 also includes resilient locking elements 146 that cooperatively engage with the corresponding key-ways 124. The resilient locking elements 146 of the second embodiment are preferably disposed on the valve member 140 with the radial lugs 144.

Each resilient locking element 146 is preferably in the shape of a protruding finger, and extends above the neck 142 of the valve member 140. The valve member 140 also includes a recess 148 into which the resilient locking element 146 is compressed while the cap member 120 is being mounted onto and released from the valve member 140. The recesses 148 are preferably arcuate and similar in shape to the resilient locking elements 146, so that the valve member 140 complete with finger and recess 148 can be formed from a single piece. Each resilient locking element 146 is relaxed during engagement, and stressed while the cap member 120 is being mounted onto and released from the valve member 140.

Figure 7:
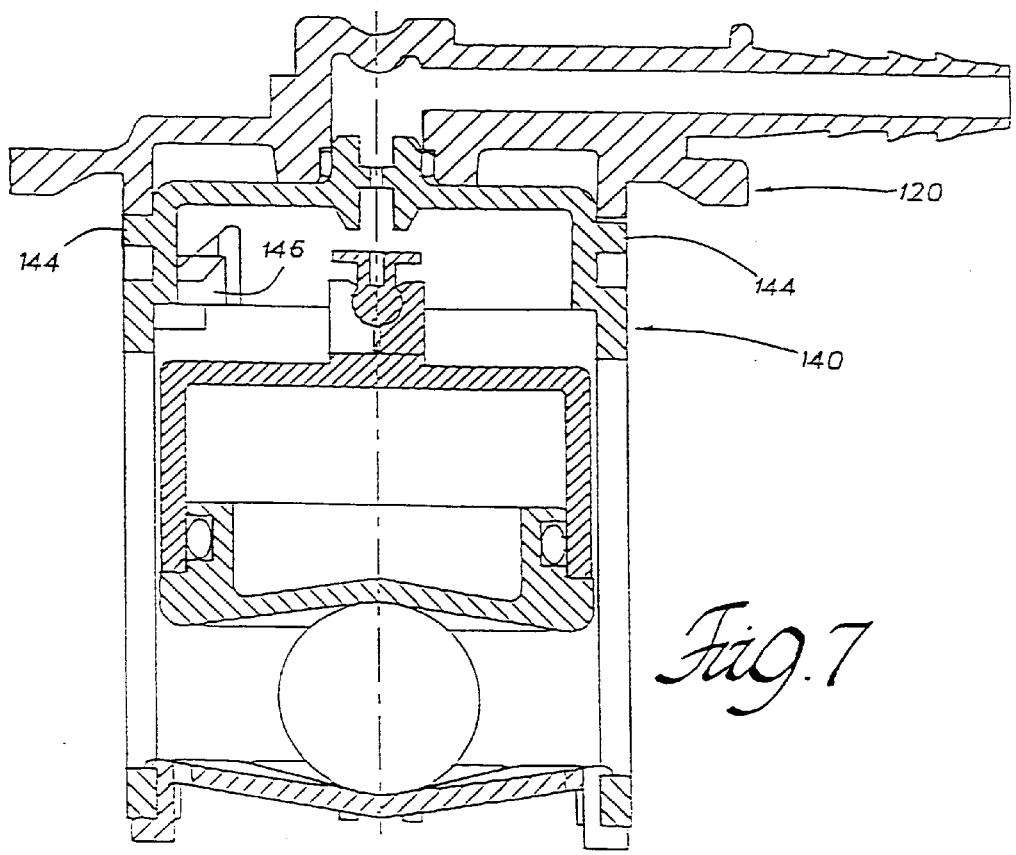
FIG. 7 is a detailed section taken substantially along the line 7—7 of FIG. 6 looking in the direction of the arrows.
Figure 8:
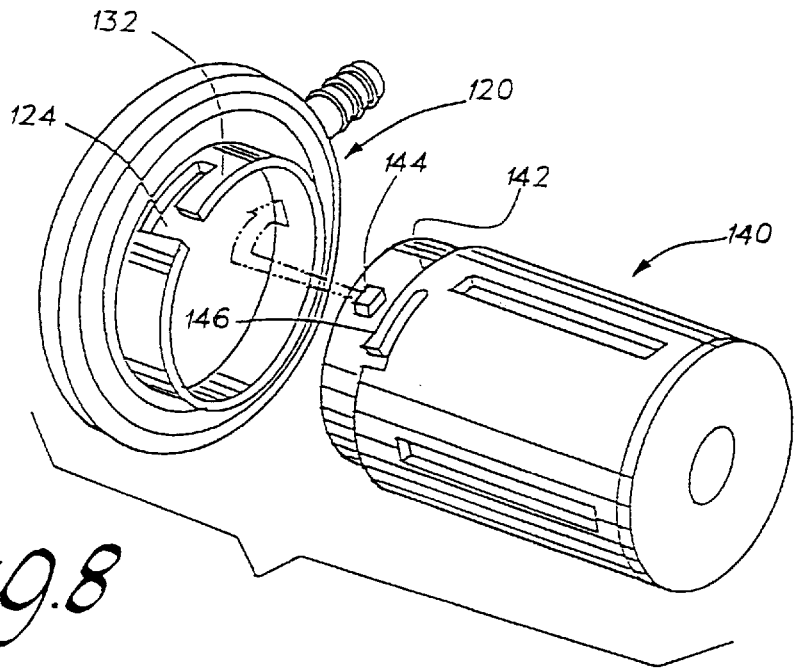
FIG. 8 is an exploded perspective view of the fuel vapor vent valve of FIG. 6.

The cap member 120 as shown in FIGS. 6, 7 and 8 preferably includes two resilient locking elements 146 diametrically opposed from each other. In order to release the members from engagement, the resilient locking elements 146 must be manually depressed (see FIG. 9) simultaneously into the adjoining recesses 148 as the fitting member 120 is twisted initially in the tangential plane, and subsequently withdrawn along the axial plane.

The retention means 114 and the resilient locking elements 146 combine to enable secure engagement between the valve member 140 and the cap member 120 radially, tangentially, and axially.

Relative radial movement between the cap and valve members 120 and 140 during engagement is prevented by making the fitting member 120 slightly larger circumferentially than the body member 140, so that the body member 140 nests comfortably within the fitting member 120.

Relative tangential movement between the cap and valve members 120 and 140 during engagement is prevented in that a face 147 of the resilient locking element 146 abuts the entry portion 125 of the key-way 124, preventing relative rotation in the counterclockwise direction. Engagement between the radial lug 144 and the end portion 126 of the key-way 124 prevents relative rotation between the members in the opposing clockwise direction.

Relative axial movement between the cap and valve members 120 and 140 during engagement is prevented in that the lug 144 in combination with the key-way 124, sandwich about a protruding extension of the cap member 120.

The opposing resilient locking element 146 operates as a safety to prevent inadvertent depression of the resilient locking element 146. In applications where a permanent attachment between the cap and valve members 120 and 140 is needed, more than two resilient locking elements 146 are recommended. The difficulty of releasing the cap and valve members 120 and 140 from engagement increases with the addition of each locking element 146. In applications where frequent disengagement is necessary, a single resilient locking element 146 may be preferred.

FIG. 8 discloses the cap member 120 of FIG. 6 being mounted onto the valve member 140. Initially, the cap member 120 is positioned relative to the valve member 140 along an axial plane as the radial lugs 144 are aligned with the key-ways 124.

As the radial lugs 144 slide into the key-ways 124, the resilient locking elements 146 are depressed inwardly towards the corresponding recesses 148 in the body member 140 until the radial lugs 144 reach a first stop in their respective key-ways 124.

The cap and valve members 120 and 140 are then rotated relative to each other until the radial lugs 144 reach the end portion 126 of their respective key-ways 124. The resilient locking elements 146 are relaxed as they enter the key-ways 124 and engagement occurs. The resilient locking elements 146 are relaxed during engagement.

Figure 9:
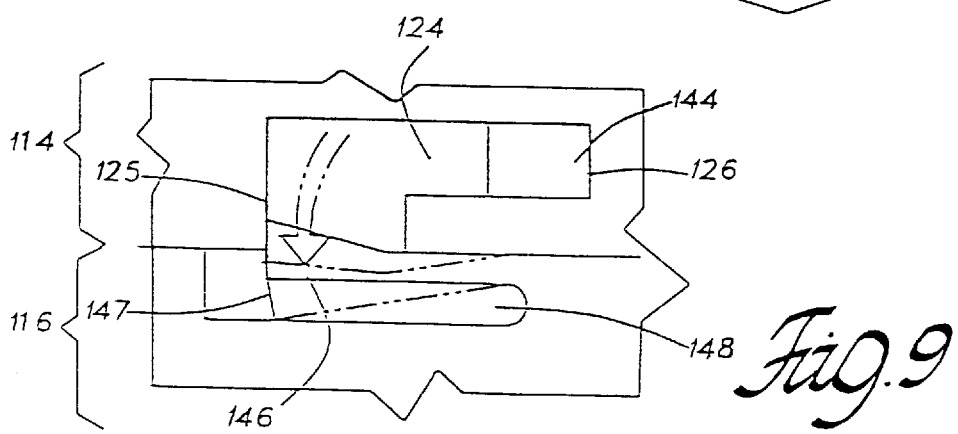
FIG. 9 is an enlarged fragmentary view of the valve coupling mechanism of FIG. 6.

FIG. 9 discloses the cap member 120 of FIG. 6 being released from the valve member 140.

The valve member 140 is initially in the engagement position relative to the cap member 120. To initiate release, all of the resilient locking elements 146 must be simultaneously depressed towards their respective recesses 148 and away from the radial lugs 144 until the faces 147 clear the entry portions 125 of the key-ways 124 as shown in phantom in FIG. 9. The cap member 120 is then twisted or rotated relative to the valve member 140, until the radial lug 144 encounters a radial stop against the key-way 124.

The cap member 120 is then withdrawn axially relative to the valve member 140 as the radial lugs 144 slide through the axial entry portion 125 of the key-ways 124, until the cap member 120 is released from the valve member 140.

Figure 10:
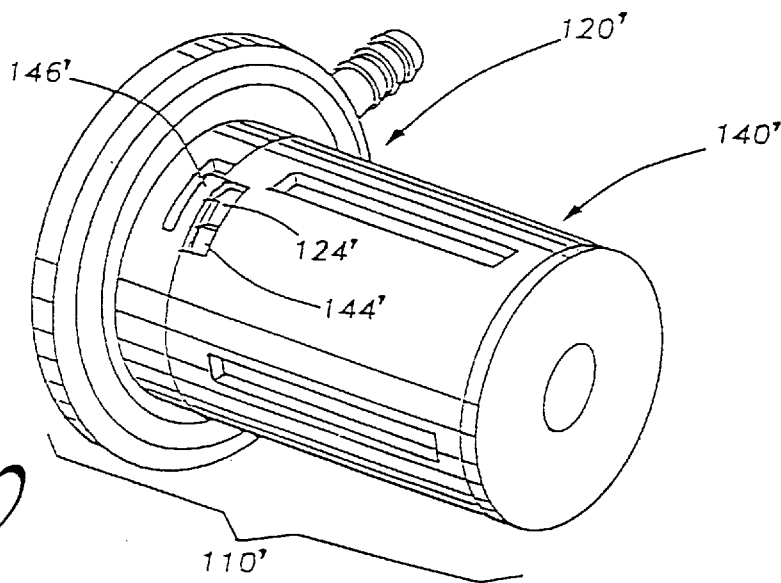
FIG. 10 is a perspective view of a modification of the fuel vapor vent valve shown in FIGS. 6–9.

FIG. 10 discloses a modification of the second preferred embodiment of the valve coupling mechanism 110 that is very similar. In the modified valve coupling mechanism 110' the resilient locking elements 146' and the lugs 144 are disposed on the skirt of the cap member 120' and the corresponding key-ways 124' are disposed on the valve member 140.' The vent valve of FIG. 10 is otherwise the same as the vent valve of FIGS. 6–9.

While the valve coupling mechanism of the invention has been illustrated in connection with a vent valve having a multi-piece housing, it should be understood that the invention is applicable to any valves having a multi-piece housing and in an even broader aspect to any coupling mechanism for connecting two members together.

Obviously, many modifications and variations of the present invention in light of the above teachings may be made. It is, therefore, to be understood that, within the scope of the appended claims, the invention may be practiced otherwise than as specifically described.

We claim:

1. A valve having multi-part valve housing for insertion into a tank through an opening through a wall of the tank comprising:

a valve member having a cylindrical wall that has a first outer diameter that is no greater than the diameter of the opening through the wall of the tank whereby the valve member is adapted to be inserted into the tank through the opening through the wall of the tank, the valve member including a top wall having an upper collar and a passage that extends through the collar to a lower valve seat, a cap member having a flange that has a second outer diameter that is greater than the diameter of the opening through the wall of the tank whereby the flange is adapted to be attached to an exterior surface of the wall of the tank, the cap member including a lower collar and a passage through the lower collar that extends to an exit above the flange, the upper collar and the lower collar cooperating to form a sealed passage from the valve seat to the exit when the cap member is coupled to the valve member, and means for coupling the cap member to the valve member including a circumferential key way in a first one of the members, a radial lug on a second one of the members that is engaged in a coupling position in the key way of the first one of the members by rotating the second one relative to the first one, and means for retaining the radial lug in the coupling position in the circumferential key way including a resilient finger on one of the members that engages a notch in another one of the members.

2. The valve having a multi-part valve housing as defined in claim 1 wherein the key way is in an annular skirt of the cap member and the radial lug is part of the valve member.

3. The valve having a multi-part valve housing as defined in claim 2 wherein the resilient finger is part of the valve member and the notch is part of the annular skirt of the cap member.

4. The valve having a multi-part valve housing as defined in claim 3 wherein the radial lug projects inwardly toward a center of the valve member and the resilient finger is a cantilever beam that extends outwardly from an anchor spaced radially inwardly of the cylindrical wall of the valve member.

5. The valve having a multi-part valve housing as defined in claim 4 wherein the annular skirt of the cap member fits inside the cylindrical wall of the valve member and the resilient finger does not extend outwardly of the cylindrical wall.

6. The valve having a multi-part valve housing as defined in claim 3 wherein the radial lug projects outwardly away from a center of the valve member and the resilient finger is cut-out of the cylindrical wall of the valve member.

7. A valve having a multi-part valve housing for insertion into a tank through an opening through a wall of the tank comprising:

a valve member having a cylindrical wall that has a first outer diameter that is no greater than the diameter of the opening through the wall of the tank whereby the valve member is adapted to be inserted into the tank through the opening through the wall of the tank, the valve member including a top wall having an upper collar and a passage that extends through the collar to a lower valve seat, a cap member having a flange that has a second outer diameter that is greater than the diameter of the opening through the wall of the tank whereby the flange is adapted to be attached to an exterior surface of the wall, the cap member including an annular skirt that fits inside the cylindrical wall of the body member, a lower collar and a passage through the lower collar that extends to an exit above the flange, the upper collar and the lower collar cooperating to form a sealed passage from the valve seat to the exit when the cap member is coupled to the valve member, and means for coupling the cap member to the valve member including a circumferential key way in the annular skirt of the cap member, a radial lug on the cylindrical wall of the valve member that extends radially inwardly and is engaged in a coupling position in the key way of the cap member by rotating the cap member relative to the valve member, and means for retaining the radial lug in the coupling position in the circumferential key way.

8. The valve having a multi-part valve housing as defined in claim 7 wherein the means for retaining the radial lug in the coupling position includes a resilient finger of the valve body that engages a notch in the annular skirt of the cap member.

9. The valve having a multi-part valve housing as defined in claim 8 wherein the resilient finger is a cantilever beam that extends outwardly from an anchor spaced radially inwardly of the cylindrical wall of the valve member.

10. The multi-part valve housing as defined in claim 9 wherein the cantilever beam does not extend outwardly of the cylindrical wall of the valve member.

11. A snag-proof arrangement for coupling a first member to a second member comprising:

the first member having a cylindrical wall that has a first outer diameter, the second member having a flange that has a second outer diameter that is greater than the first outer diameter of the first member and an annular skirt that fits inside the cylindrical wall of the first member, a circumferential key way in the annular skirt of the second member, a radial lug on the cylindrical wall of the first member that extends radially inwardly and is engaged in a coupling position in the key way of the second member by rotating the second member relative to the first member, and means for retaining the radial lug in the coupling position in the circumferential key way.

12. The snag-proof arrangement as defined in claim 11 wherein the means for retaining the radial lug in the coupling position comprises a resilient finger of the first member that engages a notch in the annular skirt of the second member.

13. The snag-proof arrangement as defined in claim 12 wherein the resilient finger is a cantilever beam that extends outwardly from an anchor spaced radially inwardly of the cylindrical wall of the first member.

14. The snag-proof arrangement as defined in claim 13 wherein the cantilever beam does not extend outwardly of the cylindrical wall of the first member.

15. The snag-proof arrangement as defined in claim 14 wherein the first member includes a top wall having an upper collar and a passage that extends through the collar to a lower valve seat, the second member has a lower collar and a passage through the lower collar that extends to an exit above the flange, and the upper collar and the lower collar cooperate to form a sealed passage from the valve seat to the exit when the second member is coupled to the first member.

16. A coupling mechanism for acting upon two members in a radial, an axial, and a tangential plane, comprising:

a first member cooperatively engageable upon a second member;

the first member having a key-way that has an open end and a closed end;

the second member having a retention lug and a resilient locking element that are cooperatively engageable with the key-way, the retention lug being engageable with the closed end of the key-way and at least a portion of an end of the resilient locking element being resiliently and selectively engageable with a wall portion of the open end of the key-way to secure the first member relative to the second member along radial, axial, and tangential planes and to prevent rotation of the first member relative to the second member in either one of a clockwise and counterclockwise direction.

17. The coupling mechanism of claim 16, wherein depression of the resilient locking element is necessary to disengage the first member relative to the second member.

18. The coupling mechanism of claim 16, wherein the resilient locking element is relaxed when the first and second members are secured together, and is stressed while the first member is being secured to or released from the second member.

19. The coupling mechanism of claim 16, wherein engagement between the resilient locking element and the open end of the key-way prevents rotation in one direction, and engagement between the lug and the closed end of the key-way prevents rotation in the other direction.

20. The coupling mechanism of claim 16, wherein the key-way has an axial portion at the open end that engages the resilient locking element and a circumferential portion at the closed end that engages the radial lug.

21. The coupling mechanism of claim 16, wherein engagement between the lug and the closed end of the key-way prevents relative axial movement.

22. The coupling mechanism of claim 16, wherein the first member having the resilient locking element also includes a spacing therein into which the resilient locking element is depressed while the first member is being secured to or released from the second member.

23. The coupling mechanism of claim 16 wherein the end of the resilient locking element is exposed when the second member is secured to the first member.

24. A coupling mechanism for acting upon two members in a radial, an axial and a tangential plane, comprising:

a first member cooperatively engageable upon a second member, the first member having a key-way that has an axial entrance portion and a circumferential terminal portion, the second member having a retention lug and a resilient locking element that are cooperatively engageable with the key-way, the retention lug being engageable with the terminal portion of the key-way and the resilient locking element being resiliently and selectively engageable with a wall portion of the entrance portion of the key-way to secure the first and second members together and to prevent relative rotation of the first member relative to the second member, the resilient locking element being relaxed when the first and second members are secured together and being stressed while the first member is being secured to or released from the second member; and depression of the resilient locking element being necessary while the first member is being secured to or released from the second member.

25. The coupling mechanism of claim 24 wherein engagement between the resilient locking element and the entrance portion of the key-way prevents rotation in one direction, and engagement between the lug and the terminal portion of the key-way prevents rotation in the other direction.

26. The coupling mechanism of claim 24 wherein the resilient locking element is a protruding finger.

27. The coupling mechanism of claim 24, wherein engagement between the lug and the terminal portion of the key-way prevents relative axial movement.

28. The coupling mechanism of claim 24, wherein the first member having the resilient locking element also includes a spacing therein for depression of the resilient locking element while the first member is being secured to or released from the second member.

29. A valve coupling mechanism for acting upon two members in a radial, an axial, and a tangential plane, comprising:

a first member cooperatively engageable upon a second member;

the first member having a plurality of L-shaped key-ways that have entrance ends and terminal ends;

the second member having a plurality of lugs that are engageable with the terminal ends of the plurality of key-ways to secure the first member relative to the second member axially and in one rotational direction, and the second member having a plurality of resilient fingers that are resiliently and selectively engageable with wall portions of the entrance ends of the plurality of key-ways to secure the first-member to the second member in an opposite rotational direction.

* * * * *

UNITED STATES PATENT AND TRADEMARK OFFICE
CERTIFICATE OF CORRECTION

PATENT NO.    : 5,960,819

DATED         : October 05, 1999

INVENTOR(S)   : Peter G. Weissinger, et al.

It is certified that errors appear in the above-identified patent and that said Letters Patent is hereby corrected as shown below:

In the title, after "MULTI-" delete "PART" and insert therefor --PIECE--.

Signed and Sealed this

Twenty-seventh Day of March, 2001

Attest:

NICHOLAS P. GODICI

Attesting Officer

Acting Director of the United States Patent and Trademark Office